United States Patent
Goergen (10) Patent No.: US 10,172,216 B2
(45) Date of Patent: Jan. 1, 2019

(54) CONTROL OF NETWORKED LIGHTING DEVICES

(71) Applicant: PHILIPS LIGHTING HOLDING B.V., Eindhoven (NL)

(72) Inventor: Daniel Martin Goergen, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 11 days.

(21) Appl. No.: 15/512,562

(22) PCT Filed: Sep. 14, 2015

(86) PCT No.: PCT/EP2015/070959
§ 371 (c)(1),
(2) Date: Mar. 19, 2017

(87) PCT Pub. No.: WO2016/046005
PCT Pub. Date: Mar. 31, 2016

(65) Prior Publication Data
US 2017/0208672 A1      Jul. 20, 2017

(30) Foreign Application Priority Data
Sep. 25, 2014   (EP) .................................. 14186304

(51) Int. Cl.
*H05B 37/02* (2006.01)
*H04L 12/00* (2006.01)
(Continued)

(52) U.S. Cl.
CPC ......... *H05B 37/0272* (2013.01); *H04L 12/00* (2013.01); *H04L 12/282* (2013.01);
(Continued)

(58) Field of Classification Search
CPC ............ H05B 37/0272; H05B 37/0281; H05B 37/029
(Continued)

(56) References Cited

U.S. PATENT DOCUMENTS

2004/0122975 A1   6/2004 Lennestal et al.
2005/0179404 A1*  8/2005 Veskovic ........... H05B 37/0254
                                                        315/291
(Continued)

FOREIGN PATENT DOCUMENTS

| EP | 2592908 A1 | 5/2013 |
|----|------------|--------|
| WO | WO2012085738 A1 | 6/2012 |
| WO | WO2014024078 A1 | 2/2014 |

*Primary Examiner* — Tung X Le
(74) *Attorney, Agent, or Firm* — Akarsh P. Belagodu (57) ABSTRACT

A control device for controlling a plurality of lighting devices via a network is disclosed. The control device 100 comprises a receiver (102) for receiving a signal based on a user input related to adjusting a control parameter of the plurality of lighting devices (114, 116). The control device further comprises a processor (104) for generating, based on the received signal, on a predetermined network capacity and on the number of user input commands received within a predetermined time period, one of: a plurality of messages of a first type (108) and a single message of a second type (110). The control device further comprises a transmitter (106) for transmitting the generated plurality of messages of a first type (108) or the single message of a second type (110) via the network (112), thereby adjusting the control parameter of the plurality of lighting devices (114, 116). The control device is able to utilize the network optimally by generating messages based on their impact on the network. This may improve the control of the plurality of lighting devices and provide an optimized user experience.

11 Claims, 4 Drawing Sheets

(51) Int. Cl.
*H04W 88/06* (2009.01)
*H04L 12/28* (2006.01)
*H05B 33/08* (2006.01)

(52) U.S. Cl.
CPC ......... *H04L 12/2807* (2013.01); *H04W 88/06* (2013.01); *H05B 33/0815* (2013.01); *H05B 37/029* (2013.01); *H05B 37/0281* (2013.01)

(58) Field of Classification Search
USPC ....................................................... 315/312
See application file for complete search history.

(56) References Cited

U.S. PATENT DOCUMENTS

| | | | |
|---|---|---|---|
| 2007/0147411 A1 | 6/2007 | Bijwaard et al. | |
| 2008/0192767 A1* | 8/2008 | Howe | H05B 37/0254 370/449 |
| 2009/0150943 A1 | 6/2009 | Vasudevan et al. | |
| 2011/0068900 A1 | 3/2011 | Billig et al. | |
| 2013/0063042 A1* | 3/2013 | Bora | H05B 33/0863 315/292 |
| 2013/0147366 A1* | 6/2013 | Huizenga | H05B 37/02 315/152 |
| 2013/0293153 A1 | 11/2013 | Van Endert et al. | |
| 2014/0177469 A1* | 6/2014 | Neyhart | H04L 12/2807 370/254 |
| 2015/0351191 A1* | 12/2015 | Pope | H05B 33/0863 315/294 |

\* cited by examiner

CONTROL OF NETWORKED LIGHTING DEVICES

CROSS-REFERENCE TO PRIOR APPLICATIONS

This application is the U.S. National Phase application under 35 U.S.C. § 371 of International Application No. PCT/EP2015/070959, filed on Sep. 14, 2015, which claims the benefit of European Patent Application No. 14186304.3, filed on Sep. 25, 2014. These applications are hereby incorporated by reference herein.

FIELD OF THE INVENTION

The invention relates to a control device for controlling a plurality of lighting devices.

BACKGROUND

Future and current home and professional environments will contain a large number of controllable lighting devices for creation of ambient, atmosphere, accent or task lighting. These controllable lighting devices are often connected and controlled via a (wireless) network. These lighting devices can be controlled individually or in groups via a user interface of a smart device (e.g. a smartphone or a tablet pc). When groups of lighting devices are controlled, current lighting control network systems may not be able to guarantee synchronized control of these devices mainly because these devices are controlled via individual control commands. Group control commands may guarantee synchronicity, although they often have a bigger impact on the network and may therefore be prone to delaying the execution of the commands due to the limited network capability. These problems have a negative effect on the usability of the system and may result in a negative user experience.

U.S. application 2011/0068900 A1 relates to a method of and a system for commissioning and controlling lighting devices using location-based addresses instead of device or logical addresses. The lighting devices communicate over a wireless network using radio frequency communication protocols. The lighting devices are commissioned or grouped based on their respective locations in a building floor plan or a building architecture. The lighting devices are commissioned to respond to radio frequency communications that correspond to their respective locations. This imposed location-based architecture reduces the amount of transmitted data required to control the lighting devices and, thus, reduces the radio bandwidth required to control the lighting devices. In other words, controlling devices "multicast" instructions and controlled devices "listen" for instructions and act only upon instructions that correspond to their respective location. Hand shaking or two-way communication between the controlling devices and the controlled devices is not required.

U.S. application 2013/0293153 A1 relates to a lighting device wherein a primary control unit and a group of light units are arranged in a power supply chain, each light unit of said group being arranged for receiving commands from the primary control unit via a light unit interface of the light unit, and wherein each succeeding unit of the chain has a power input which is connected to a switchable power output of a respective preceding unit, each preceding unit being arranged to supply power at the power output only after initializing an address identification of the unit, and each succeeding unit being arranged to initialize an address identification of the unit upon being supplied with power at the power input. The address initialization of units of the lighting device within the lighting device is therefore simplified.

SUMMARY OF THE INVENTION

It is an object of the present invention to solve problems related to non-synchronicity and delay of control of multiple networked lighting devices due to network limitations. According to a first aspect of the present invention the object is achieved by a control device for controlling a plurality of lighting devices via a network. The control device comprises:

- a receiver for receiving a signal based on a user input related to adjusting a control parameter of the plurality of lighting devices,
- a processor for generating, based on the received signal and on a predetermined network capacity, one of: a plurality of messages of a first type and a single message of a second type, and
- a transmitter for transmitting the plurality of messages of a first type if the plurality of messages of a first type (108) are generated, or the single message of a second type if the single message of a second type is generated, via the network, thereby adjusting the control parameter of the plurality of lighting devices wherein the generation of the one of: the plurality of messages of a first type and the single message of a second type is further based on a characteristic of the user input, which characteristic is related to a number of user input commands received within a predetermined time period.

The control device makes a trade-off between maximizing synchronicity and minimizing delay between the user input and the execution of the input by generating messages based on their impact on the network. Occasionally varying between the generation of the plurality of messages of a first type and the single second message of a second type, while considering their impact on the network, may result in an optimized user experience. The control device provides the advantage that it is able to utilize the network optimally by generating messages based on their impact on the network.

In an embodiment the predetermined network capacity is based on a maximum number of messages of a first type that can be accommodated by the network within a predetermined time period and a maximum number of messages of a second type that can be accommodated by the network within a predetermined time period. It is advantageous when the control device has access to information about the network capacity, because it enables the control device to determine the type and number of messages to generate within a predetermined time period without exceeding the network capacity.

In an embodiment the message of a first type is a unicast message addressed to a single lighting device of the plurality of lighting devices. Therefore, the processor of the control device generates a plurality of unicast messages for each lighting device whose parameters may be adjusted by the user input. The unicast messages are transmitted sequentially. In this embodiment, the message of a second type is a multicast message addressed to the plurality of lighting devices. Therefore, the processor of the control device generates one single message for the plurality of lighting devices. The transmission of unicast messages and multicast messages may have a different impact on the network (e.g. transmitting a unicast message may have a lower impact on the network than transmitting a multicast message). It is advantageous to be able to occasionally vary between unicast and multicast messages to control the parameters of lighting devices because it allows the control device to use the network optimally while executing user input-based commands.

In an embodiment the signal that is received by the receiver comprises one of: a single user input command, a stream of user input commands or the end of a stream of user input commands. The impact on the network may be related to the number of user input commands received within a predetermined time period (e.g. a stream of user input commands may have a higher impact than a series of single user input commands). Therefore, the decision to generate the plurality of messages of a first type or the single message of a second type to execute the commands may depend on the characteristics of the command. It may be advantageous to distinguish between different types of user input because it allows the control device to optimize the user experience by generating a message related to the specific user input, thereby possibly maximizing synchronicity and minimizing delay between the user input and the execution of the input.

In an embodiment the processor of the control device is further arranged for determining network utilization relative to the predetermined network capacity, and the generation of the plurality of messages of a first type or the single message of a second type is further based on the network utilization. In this embodiment the processor has access to information about the current network traffic and the maximum network traffic, which is advantageous because it enables the processor to make a more sophisticated decision whether to generate the plurality of messages of a first type or the single message of a second type. Additionally, the network utilization may be determined based on a number of signals (based on the user input) received within a predetermined time period. Additionally or alternatively, the network utilization may be determined based on the number and/or the type of messages transmitted within a predetermined time period. In an additional or alternative embodiment the control device is further arranged for receiving information about the network utilization from a device in the network (e.g. from a lighting device, a router, a bridge). Tracking the amount of data (e.g. the number of messages and the type of messages transmitted by the transmitter) that is transferred within the network is advantageous because it enables the processor of the control device to make a more sophisticated decision whether to generate the plurality of messages of a first type or the single message of a second type.

In an embodiment the transmitter of the control device is further arranged for communicating the plurality of messages of a first type or the single message of a second type to the plurality of lighting devices through an intermediate communication device. The intermediate communication device may function as a bridge between the control device and the plurality of lighting devices. Additionally or alternatively, the transmitter of the control device may be further arranged for transmitting the signal (based on the user input) to the intermediate communication device, which may comprise means for receiving the signal and generate the plurality of messages of a first type or the single message of a second type based on the signal. The use of an intermediate communication device may be advantageous in that it may provide an interface platform between the control device and the plurality of lighting devices, thereby possibly simplifying the control device.

In an embodiment the control device further comprises a user interface arranged for receiving the user input. The processor may be further arranged for processing the user input received from the user via the user interface. The user input may for example comprise adjusting a control parameter of the plurality of lighting devices (for example the colour of the plurality of lighting devices). The user input may comprise selecting the plurality of lighting devices. The user input may further comprise grouping and/or ungrouping of the plurality of lighting devices. The user interface may comprise a touch-sensitive device such as a touchpad or a touchscreen, an audio sensor such as a microphone, a motion sensor such as an accelerometer and/or a gyroscope for detecting movement and/or one or more buttons for receiving the user input. An advantage of comprising a user interface in the control device is that it may receive the user input directly, which may improve the speed of controlling the plurality of lighting devices.

According to a second aspect of the present invention the object is achieved by a method of controlling a plurality of lighting devices via a network. The method comprises the steps of:

receiving a signal based on a user input related to adjusting a control parameter of the plurality of lighting devices, generating, based on the received signal and on a predetermined network capacity, one of: a plurality of messages of a first type and a single message of a second type, transmitting the plurality of messages of a first type if the plurality of messages of a first type are generated, or the single message of a second type if the single message of a second type is generated, via the network, thereby adjusting the control parameter of the plurality of lighting devices, wherein the generation of the one of: the plurality of messages of a first type and the single message of a second type is further based on a characteristic of the user input, which characteristic is related to a number of user input commands received within a predetermined time period.

In embodiments of the method an additional step may be included to determine network utilization relative to the predetermined network capacity, wherein the generation of the plurality of messages of a first type or the single message of a second type is further based on the network utilization.

Further disclosed is a computer program product for a computing device, the computer program product comprising computer program code to perform the abovementioned method when the computer program product is run on a processing unit of the computing device.

BRIEF DESCRIPTION OF THE DRAWINGS

The above, as well as additional objects, features and advantages of the disclosed devices and methods, will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
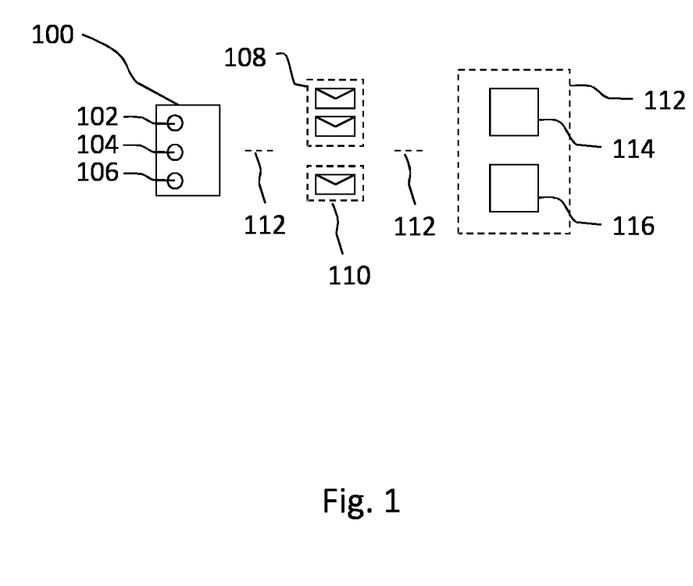
FIG. 1 schematically shows an embodiment of a control device according to the invention for controlling a plurality of lighting devices via a network.

FIG. 1 schematically shows an embodiment of a control device 100 for controlling a plurality of lighting devices 114, 116 via a network 112. The control device 100 comprises a receiver 102 for receiving a signal based on a user input related to adjusting a control parameter of the plurality of lighting devices 114, 116, a processor 104 for generating, based on the received signal and on a predetermined network capacity, one of: a plurality of messages of a first type 108 and a single message of a second type 110, and a transmitter 106 for transmitting the generated plurality of messages of a first type 108 or the single message of a second type 110 via the network 112, thereby adjusting the control parameter of the plurality of lighting devices 114, 116. The plurality of lighting devices 114, 116 and the control device 100 are connected via a wireless network 112 (e.g. a mesh structured network). The plurality of lighting devices 114, 116 may be a group of any type of lighting devices with adjustable parameters. The plurality of lighting devices 114, 116 may be, for example, a group of lighting devices comprised in a single luminaire, or each lighting device of the group of lighting devices may be comprised in an individual luminaire, while a combination of both may also be possible. The control device 100 may further comprise a battery (not shown) or auxiliary power for powering the different components in the control device 100. The control device 100 may be any device arranged for controlling lighting devices. For example, the control device 100 may be a smartphone arranged for receiving the signal (based on a user input received from for example the user interface of the smartphone) for adjusting the control parameters of the plurality of lighting devices 114, 116. The processor 104 of the smartphone may generate the plurality of messages of a first type 108 or the single message of a second type 110 and the transmitter 106 of the smartphone may transmit the plurality of messages of a first type 108 or the single message of a second type 110 (for example via Bluetooth, Wi-Fi or Zigbee) to the plurality of lighting devices 114, 116. An advantage of using a smartphone as a control device is that it may already be equipped with the wireless communication protocols that are required to control lighting devices, and that a smartphone may already comprise a user interface arranged for receiving user input. In another exemplary embodiment, the control device 100 may be a bridge arranged for receiving the signal from a further device (e.g. via Bluetooth, Wi-Fi or Zigbee) and the processor 104 of the bridge generates the plurality of messages of a first type 108 or the single message of a second type 110 based on the signal and the network capacity, and the transmitter 106 of the bridge may transmit the generated plurality of messages of a first type 108 or the single message of a second type 110 to the plurality of lighting devices 114, 116. The advantage of using a bridge or any other routing device is that it may be arranged for communicating via network protocols dedicated to communication with lighting devices (e.g. via a DALI lighting network protocol) and/or possibly with other connected devices (e.g. via a home automation network protocol).

The receiver 102 of the control device 100 is arranged for receiving the signal which is based on a user input. The signal may for example be received via a wired connection (e.g. via USB or via a local area network) or a wireless connection (e.g. via ZigBee or via a wireless local area network). The signal may be generated by any device with means to communicate the signal to the control device 100 (e.g. by a PC that is arranged for controlling the plurality of lighting devices) or by the control device itself (e.g. via a user interface of the control device). The user input may be any input related to adjusting the control parameter, for example the colour, of a plurality of lighting devices 114, 116.

The processor 104 of the control device 100 is arranged for generating, based on the received signal and on a predetermined network capacity, one of: a plurality of messages of a first type 108 and a single message of a second type 110. The processor 104 may have access to information about the predetermined network capacity, which may be based on the maximum traffic that the network 112 can handle. Based on the network capacity and the signal (and therewith the type of user input) the processor 104 determines to generate the plurality of messages of a first type 108 (e.g. sequential individual messages addressed to individual lighting devices) or the single message of a second type 110 (e.g. a group message broadcasted to all lighting devices).

The transmitter 106 of the control device 100 is arranged for transmitting the generated plurality of messages of a first type 108 or the single message of a second type 110 to the plurality of lighting devices 114, 116 via the network 112. The message(s) may be transmitted via any wireless network protocol (e.g. via ZigBee or Bluetooth low energy) which is compatible with the networked lighting devices.

In a further embodiment the predetermined network capacity is based on a maximum number of messages of a first type 108 that can be accommodated by the network 112 within a predetermined time period and a maximum number of messages of a second type 110 that can be accommodated by the network 112 within a predetermined time period. In an exemplary network system the network 112 may be able to accommodate N individual messages of a first type 108 or N/5 group messages of a second type 110 (or a combination of both) within a predetermined time limit. The processor 104 of the control device 100 that is connected to this network system may have access to information about the network capacity and may therefore decide to either generate a plurality of individual messages of a first type 108, which are to be transmitted to each individual lighting device from the plurality of lighting devices 114, 116, or to generate a single group message, which is to be transmitted to the plurality of lighting devices 114, 116.

Figure 2A:
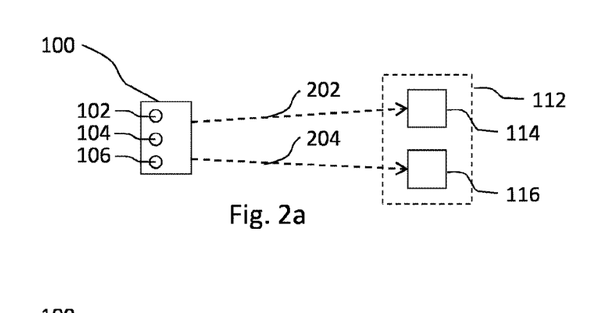
FIGS. 2a, 2b and 2c schematically show embodiments of transmission of different types of messages to control a plurality of lighting devices.
Figure 2B:
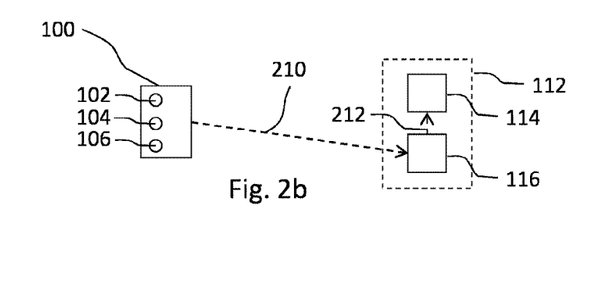
Figure 2C:
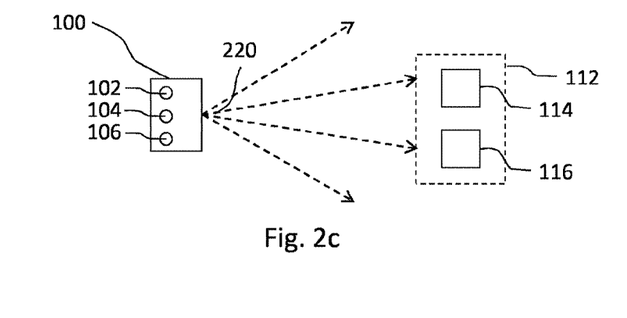

FIGS. 2a, 2b and 2c schematically show further embodiments of the control device 100 wherein the message is: a) a plurality of unicast messages 202, 204 addressed to each single lighting device of the plurality of lighting devices 114, 116, b) a multicast message 210 addressed to the plurality of lighting devices 114, 116 and forwarded via the lighting devices and c) a multicast message 210 addressed to the plurality of lighting devices 114, 116 in range of the transmitter 106. FIG. 2a schematically shows the transmission of a plurality of unicast messages 202, 204 each addressed to a specific lighting device of the plurality of lighting devices 114, 116. These messages are transmitted sequentially, for example firstly a first unicast message 202 to a first lighting device 114 and secondly a second unicast message 204 to a second lighting device 116. FIG. 2b schematically shows the transmission of a single multicast message 210 addressed to each lighting device of the plurality of lighting devices 114, 116. The multicast message 210 is received by one or more lighting devices and further transmitted via the lighting devices through a mesh structured network 212, wherein the lighting devices comprise transceivers for receiving and transmitting the messages. FIG. 2c schematically shows the transmission of a single multicast message 220 broadcasted to each lighting device of the plurality of lighting devices 114, 116 within the range of the transmitter 106. A combination of FIG. 2b and FIG. 2c, wherein a multicast message addressed to the plurality of lighting devices 114, 116 in range of the transmitter 106 is further forwarded via the lighting devices, may be advantageous because each lighting device may be reached via the mesh structured network of lighting devices. A combination of FIG. 2a and FIG. 2b, wherein sequential unicast messages are received at a lighting device of the plurality of lighting devices 114, 116 and further forwarded via the lighting devices, may be advantageous because each lighting device may be reached via the mesh structured network of lighting devices.

In another embodiment the signal received via the receiver 102 of the control device 100 comprises one of: a single user input command, a stream of user input commands or the end of a stream of user input commands. In this embodiment, the processor 104 determines, based on the characteristics of this signal (and therewith the characteristics of the user input) and the capacity of the network 112, to generate the plurality of messages of a first type 108 or the single message of a second type 110. In the following example, the lighting devices are connected via a network 112 with a predetermined network capacity able to accommodate N individual messages of a first type 108 or N/10 group messages of a second type 110 within a predetermined time period. If the user selects for example a predefined user setting to control the plurality of lighting devices 114, 116 (e.g. set all lighting devices to a yellow colour) via a single user input command (for example by tapping an icon of the predefined user setting on a user interface), the processor 104 may determine, according to the predetermined network capacity, to generate a single group message which is transmitted to the plurality of lighting devices 114, 116. If the user intends to change the colour of the plurality of lighting devices 114, 116 gradually via a continuous stream of user input commands, for example via a colour slider from red to green, the network 112 may not be able to accommodate a group message for every colour change in between the colours red and green, simply because more than N/10 group messages are to be accommodated by the network 112 within the predetermined time period. While the user is choosing the colour, the processor 104 may determine to generate a plurality of individual messages for each lighting device for every colour change in between the colours red and green. Once the user has selected the desired colour (e.g. green) via the colour slider, a single group message may be transmitted to the plurality of lighting devices 114, 116. In this example, the processor 104 makes a trade-off between minimalizing delay while the user is choosing by transmitting the plurality of individual messages when the network 112 is not able to accommodate a number of group messages and maximizing synchronicity by transmitting the single group message when a decision is made by the user. Occasionally varying between the generation of the plurality of individual messages and the single group message within a predetermined time period (e.g. for each three individual messages one group message) may result in an optimized user experience.

In another embodiment the processor 104 of the control device 100 is further arranged for determining network utilization relative to the predetermined network capacity, and the generation of the plurality of messages of a first type 108 or the single message of a second type 110 is further based on the network utilization. The network utilization may be based on a number of signals received within a predetermined time period. The network utilization may be further based on the number and/or the type of messages transmitted within a predetermined time period. In an exemplary embodiment, the control device 100 may be a bridge between a user input device (e.g. a tablet pc) and the plurality of lighting devices 114, 116. The processor of the bridge may comprise a means for storing input signals in a buffer and/or comprise a means for monitoring the number of messages transmitted within a predetermined time period. The processor of the bridge may be further arranged for determining whether to generate the plurality of messages of a first type 108 or the single message of the second type based on its buffer usage and the amount of messages transmitted. In another embodiment the control device 100 may be further arranged for receiving information about the network utilization from a further device in the network 112 (e.g. information from a networked lighting device about a buffer of the networked lighting device).

Figure 3A:
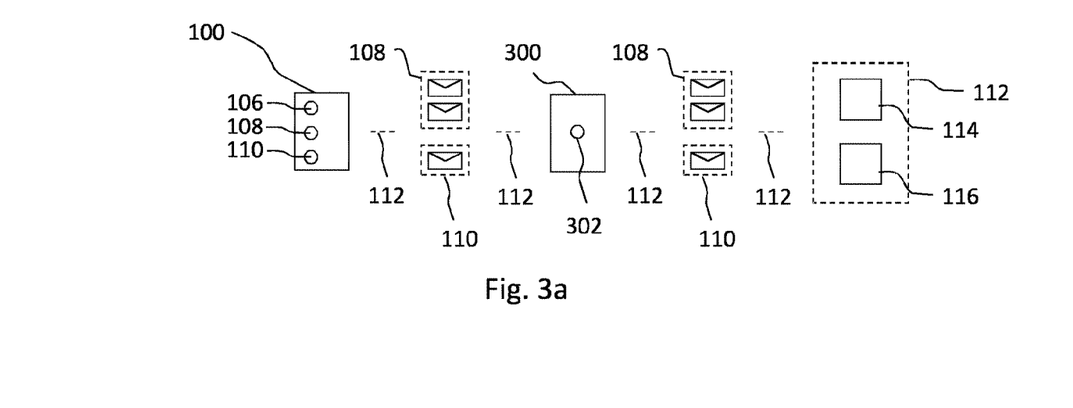
FIGS. 3a and 3b schematically show embodiments of a control device according to the invention for controlling a plurality of lighting devices through an intermediate communication device.
Figure 3B:
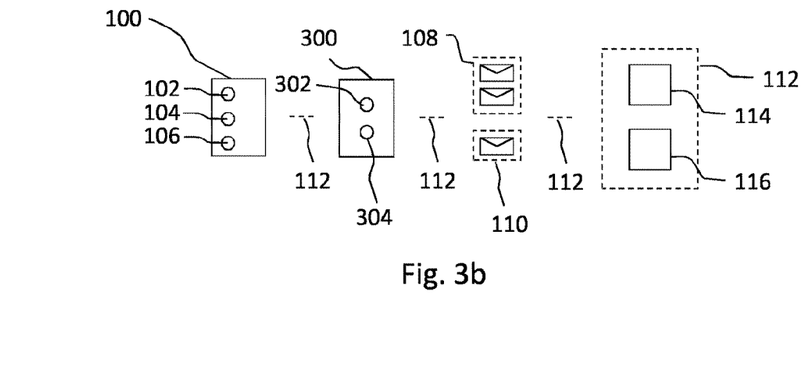

In a further embodiment of the control device 100, shown in FIG. 3a, the transmitter 106 of the control device 100 is further arranged for communicating the plurality of messages of a first type 108 or the single message of a second type 110 to the plurality of lighting devices 114, 116 through an intermediate communication device 300. Therefore, the intermediate communication device 300 may comprise a transceiver 302 arranged for communicating with the control device 100 and the plurality of lighting devices 114, 116. In a further embodiment of the control device 100, shown in FIG. 3b, the transmitter 106 of the control device 100 is further arranged for communicating the signal to an intermediate communication device 300 comprising a transceiver 302 arranged for receiving the signal and sending messages and a processor 304 for generating the plurality of messages of a first type 108 or the single message of a second type 110. An advantage of the use of an intermediate communication device 300 is that the number of connection protocols of the control device 100 may be reduced, and that the connection controls of the intermediate communication device 300 may be used for lighting control, thereby possibly reducing the complexity and the costs of the control device 100. In a further embodiment the intermediate communication device 300 may comprise a means for monitoring network utilization and it may be further arranged for communicating the network utilization to the control device 100. In a further embodiment the intermediate communication device 300 and/or the control device 100 may be connected to the internet and/or to a remote server, allowing control of the plurality of lighting devices 114, 116 from remote locations. The intermediate communication device 300 may be further arranged for providing a gateway to a network of lighting devices and/or other devices (e.g. a Philips Hue lighting network, a building management system, a DALI lighting network or a home automation network).

In a further embodiment the control device 100 further comprises a user interface (not shown) arranged for receiving a user input. The processor 104 of the control device 100 may be further arranged for processing the user input received from the user via the user interface. The user input may for example comprise adjusting a control parameter of the plurality of lighting devices 114, 116 (e.g. the colour and/or the brightness). The user input may comprise selecting the plurality of lighting devices, thereby allowing the user to select which lighting devices may be controlled. The user input may comprise an option for grouping, ungrouping and regrouping the plurality of lighting devices. The user interface may comprise, for example, a touch-sensitive device, an audio sensor, a motion sensor and/or one or more buttons for receiving the user input. The touch-sensitive device may be, for example, a touchpad or a touchscreen. This touch-sensitive device and/or the one or more buttons, may enable the user to perform any of the abovementioned user input actions. A further type of user input may comprise a movement of the user holding the control device 100, allowing the user to provide user input via, for example, gestures, tapping and/or waving, thereby adjusting the parameter of the plurality of lighting devices 114, 116. Movement may be detected by a motion sensor comprised in the control device 100 (e.g. an accelerometer and/or a gyroscope). A further type of user input may comprise a voice command or a further sound command (e.g. the sound of clapping hands) received by an audio sensor comprised in the control device 100. The user input provided via voice commands may be combined with the user input provided via the touch-sensitive device, via the buttons and/or via the motion sensor.

Figure 4:
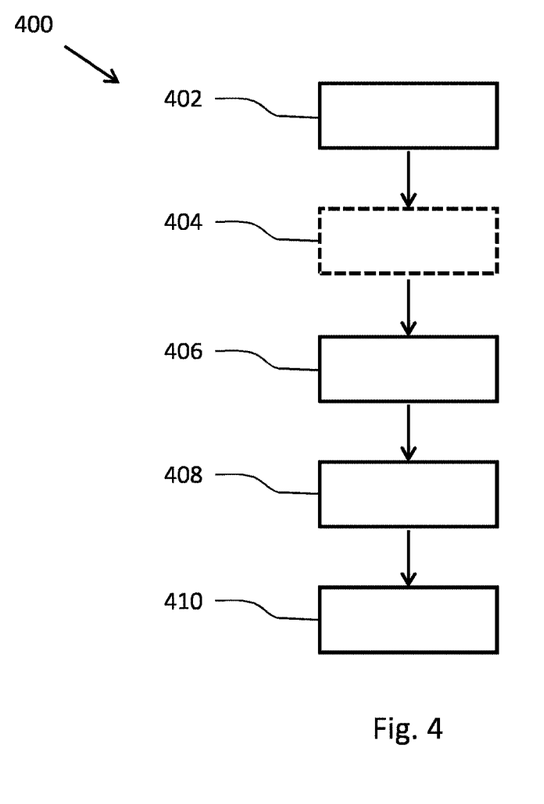
FIG. 4 shows schematically and exemplary a method of controlling a plurality of lighting devices via a network.

FIG. 4 shows schematically and exemplary a method 400 according to the invention of controlling a plurality of lighting devices via a network 112, the method comprising the steps of:
receiving 402 a signal based on a user input related to adjusting a control parameter of the plurality of lighting devices,
generating 406, based on the received signal and on a predetermined network capacity, one of: a plurality of messages of a first type and a single message of a second type,
transmitting 408 the generated plurality of messages of a first type or the single message of a second type via the network, thereby
adjusting 410 the control parameter of the plurality of lighting devices.

In a further embodiment the method shown in FIG. 4 comprises the additional step of determining 404 network utilization relative to the predetermined network capacity, wherein the generation of the plurality of messages of a first type or the single message of a second type is further based on the network utilization. The network utilization may be, for example, based on a number of signals received within a predetermined time period and/or based on the number and/or the type of messages transmitted within a predetermined time period, enabling the processor 104 to make a more sophisticated decision whether to generate the plurality of messages of a first type or the single message of a second type.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A control device for controlling a plurality of lighting devices via a network, the control device comprising:
a receiver for receiving a signal based on a user input related to adjusting a control parameter of the plurality of lighting devices,
a processor for generating, based on the received signal and on a predetermined network capacity, one of: a plurality of messages of a first type and a single message of a second type, and
a transmitter for transmitting the plurality of messages of the first type if the plurality of messages of the first type are generated, or the single message of the second type if the single message of the second type is generated, via the network, thereby adjusting the control parameter of the plurality of lighting devices,
wherein the processor is further arranged for determining network utilization relative to the predetermined network capacity,
wherein the generation of the one of: the plurality of messages of the first type and the single message of the second type is further based on the network utilization and on a characteristic of the user input, which characteristic is related to a number of user input commands received within a predetermined time period, and
wherein the message of the first type is a unicast message addressed to a single lighting device of the plurality of lighting devices and wherein the message of the second type is a multicast message addressed to the plurality of lighting devices.

2. The control device of claim 1, wherein the predetermined network capacity is based on a maximum number of messages of the first type that is configured to be accommodated by the network within a predetermined time period and a maximum number of messages of the second type that is configured to be accommodated by the network within a predetermined time period.

3. The control device of claim 1, wherein the signal comprises one of: a single user input command, a stream of user input commands or the end of a stream of user input commands.

4. The control device of claim 1 wherein the processor is further arranged for determining the network utilization based on the number and/or the type of messages transmitted within a predetermined time period.

5. The control device of claim 1, wherein the control device is further arranged for receiving information about the network utilization from a further device in the network.

6. The control device of claim 1, wherein the transmitter is further arranged for communicating the plurality of messages of the first type or the single message of the second type to the plurality of lighting devices through an intermediate communication device.

7. The control device of claim 1, wherein the control device further comprises a user interface arranged for receiving the user input comprising at least one of: adjusting a control parameter of the plurality of lighting devices, selecting the plurality of lighting devices, and grouping/ungrouping of the plurality of lighting devices.

8. The control device of claim 7, wherein the user interface comprises at least one of the group comprising a touch-sensitive device, an audio sensor, a motion sensor and one or more buttons for receiving the user input.

9. A method of controlling a plurality of lighting devices via a network, the method comprising the steps of:
- receiving a signal based on a user input related to adjusting a control parameter of the plurality of lighting devices,
- generating, based on the received signal and on a predetermined network capacity, one of: a plurality of messages of a first type and a single message of a second type,
- transmitting the plurality of messages of the first type if the plurality of messages of the first type are generated, or the single message of the second type if the single message of the second type is generated, via the network, thereby
- adjusting the control parameter of the plurality of lighting devices, wherein the generation of the one of: the plurality of messages of the first type and the single message of the second type is further based on a characteristic of the user input, which characteristic is related to a number of user input commands received within a predetermined time period,
- wherein the message of the first type is a unicast message addressed to a single lighting device of the plurality of lighting devices and wherein the message of the second type is a multicast message addressed to the plurality of lighting devices.

10. The method of claim 9, further comprising the step of determining network utilization relative to the predetermined network capacity, wherein the generation of the plurality of messages of the first type or the single message of the second type is further based on the network utilization.

11. A non-transitory computer program product for a computing device, the non-transitory computer program product comprising computer program code to perform the method of claim 9 when the non-transitory computer program product is run on a processing unit of the computing device.

* * * * *